United States Patent
Abe

(10) Patent No.: US 11,144,428 B2
(45) Date of Patent: Oct. 12, 2021

(54) EFFICIENT CALCULATION OF PERFORMANCE DATA FOR A COMPUTER

(71) Applicant: FUJITSU LIMITED, Kawasaki (JP)

(72) Inventor: Fumitake Abe, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 460 days.

(21) Appl. No.: 15/992,565

(22) Filed: May 30, 2018

(65) Prior Publication Data

US 2018/0349249 A1    Dec. 6, 2018

(30) Foreign Application Priority Data

Jun. 2, 2017    (JP) .............................. JP2017-110402

(51) Int. Cl.
| | | |
|---|---|---|
| *G06F 11/34* | (2006.01) | |
| *G06F 7/483* | (2006.01) | |
| *G06F 9/30* | (2018.01) | |
| *G06F 12/0811* | (2016.01) | |

(52) U.S. Cl.
CPC .......... *G06F 11/3466* (2013.01); *G06F 7/483* (2013.01); *G06F 9/3004* (2013.01); *G06F 12/0811* (2013.01); *G06F 11/3409* (2013.01); *G06F 11/3419* (2013.01); *G06F 2201/81* (2013.01); *G06F 2201/88* (2013.01); *G06F 2201/885* (2013.01)

(58) Field of Classification Search
None
See application file for complete search history.

(56) References Cited

U.S. PATENT DOCUMENTS

| | | | | |
|---|---|---|---|---|
| 6,233,531 | B1* | 5/2001 | Klassen | G06F 11/3466 702/180 |
| 10,025,929 | B2* | 7/2018 | Sethumadhavan | G06N 20/00 |
| 2003/0093655 | A1* | 5/2003 | Gosior | G06F 9/3851 712/228 |
| 2004/0019885 | A1* | 1/2004 | Mandava | G06F 11/3466 717/158 |
| 2008/0201566 | A1* | 8/2008 | Indukuru | G06F 9/3836 712/244 |

(Continued)

FOREIGN PATENT DOCUMENTS

| | | |
|---|---|---|
| JP | 2011-175459 | 9/2011 |
| WO | 2012/001779 | 1/2012 |

OTHER PUBLICATIONS

Japanese Office Action dated Mar. 30, 2021 for corresponding Japanese Patent Application No. 2017-110402, with English Translation, 7 pages.

*Primary Examiner* — Hyun Nam
(74) *Attorney, Agent, or Firm* — Fujitsu Patent Center

(57) ABSTRACT

An apparatus includes a memory and a processor, where the processor includes a performance counter that stores performance data for the processor. The apparatus store plural groups of calculation instructions in the memory. The apparatus calculates a first execution result by executing, based on the performance data obtained from the performance counter, each calculation instruction included in a first group of calculation instructions, and selects a second group of calculation instructions to be executed next, from among the plural groups of calculation instructions, based on the calculated first execution result.

15 Claims, 13 Drawing Sheets

(56) References Cited

U.S. PATENT DOCUMENTS

| | | | |
|---|---|---|---|
| 2009/0044198 A1* | 2/2009 | Kuiper | G06F 9/5027 718/107 |
| 2009/0259830 A1* | 10/2009 | Indukuru | G06F 9/3861 712/227 |
| 2012/0095728 A1* | 4/2012 | Ubukata | G06F 11/3466 702/186 |
| 2013/0117596 A1 | 5/2013 | Furukawa | |
| 2015/0012644 A1* | 1/2015 | Kubota | G06F 11/3495 709/224 |
| 2015/0242142 A1* | 8/2015 | Inai | G06F 3/0619 711/112 |
| 2015/0242245 A1* | 8/2015 | Brown | G06F 12/1072 718/105 |
| 2016/0034379 A1* | 2/2016 | Shah | G06F 11/3664 707/602 |
| 2016/0170476 A1* | 6/2016 | Fu | G06F 11/3447 713/310 |
| 2017/0090955 A1 | 3/2017 | Hsiao et al. | |

* cited by examiner

FIG. 3

| TYPE | EXECUTION INFORMATION GROUP |
|---|---|
| NOT SPECIFIED | MEMORY ACCESS WAIT TIME<br>STORE WAIT TIME<br>L2 ACCESS WAIT TIME<br>L1 ACCESS WAIT TIME<br>CALCULATION WAIT TIME |
| 1 | BRANCH WAIT TIME<br>FETCH WAIT TIME<br>BARRIER WAIT TIME<br>ONE-INSTRUCTION COMMIT WAIT TIME<br>TWO-AND-THREE-INSTRUCTION COMMIT WAIT TIME |
| 2 | L1D CACHE BUSY COUNT<br>L1D CACHE MISS COUNT<br>L1I CACHE MISS COUNT<br>... |
| ⋮ | ⋮ |
| 3 | L2 CACHE BUSY COUNT<br>L2 CACHE MISS COUNT<br>... |
| ⋮ | ⋮ |
| 101 | FLOATING POINT CALCULATION WAIT TIME<br>... |
| ⋮ | ⋮ |
| 999 | OBTAIN NO DATA |

| CALCULATION COUNT | TYPE | DATA | EXECUTION RESULT DATA |
|---|---|---|---|
| 1 | NOT SPECIFIED | STORE WAIT<br>LOAD MEMORY ACCESS WAIT<br>... | STORE WAIT TIME<br>MEMORY ACCESS WAIT TIME<br>... |
| 2 | 1 | BRANCH INSTRUCTION WAIT<br>BARRIER SYNCHRONIZATION WAIT | BRANCH WAIT TIME<br>BARRIER WAIT TIME |
| ⋮ | ⋮ | ⋮ | ⋮ |

152

EFFICIENT CALCULATION OF PERFORMANCE DATA FOR A COMPUTER

CROSS-REFERENCE TO RELATED APPLICATION

This application is based upon and claims the benefit of priority of the prior Japanese Patent Application No. 2017-110402 filed on Jun. 2, 2017, the entire contents of which are incorporated herein by reference.

FIELD

The embodiments discussed herein are related to efficient calculation of performance data for a computer.

BACKGROUND

There has been conventionally known a performance information collecting apparatus which efficiently collects information used for tuning of a parallel distributed program even when the amount of information to be collected is large (see Japanese Laid-open Patent Publication No. 2011-175459 and Japanese Patent No. 5510543).

SUMMARY

According to an aspect of the invention, an apparatus includes a memory and a processor where the processor includes a performance counter that stores performance data for the processor. The apparatus stores plural groups of calculation instructions in the memory. The apparatus calculates a first execution result by executing, based on the performance data obtained from the performance counter, each calculation instruction included in a first group of calculation instructions, and selects a second group of calculation instructions to be executed next, from among the plural groups of calculation instructions, based on the calculated first execution result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an explanatory diagram illustrating a record layout of an execution information group DB;

FIG. 4 is an explanatory view illustrating a record layout of a control information file;

DESCRIPTION OF EMBODIMENTS

The conventional technique has a problem that execution result data may not be efficiently obtained.

In one aspect, an object is to provide a program and the like which are capable of efficiently obtaining execution result data.

Embodiment 1

Figure 1:
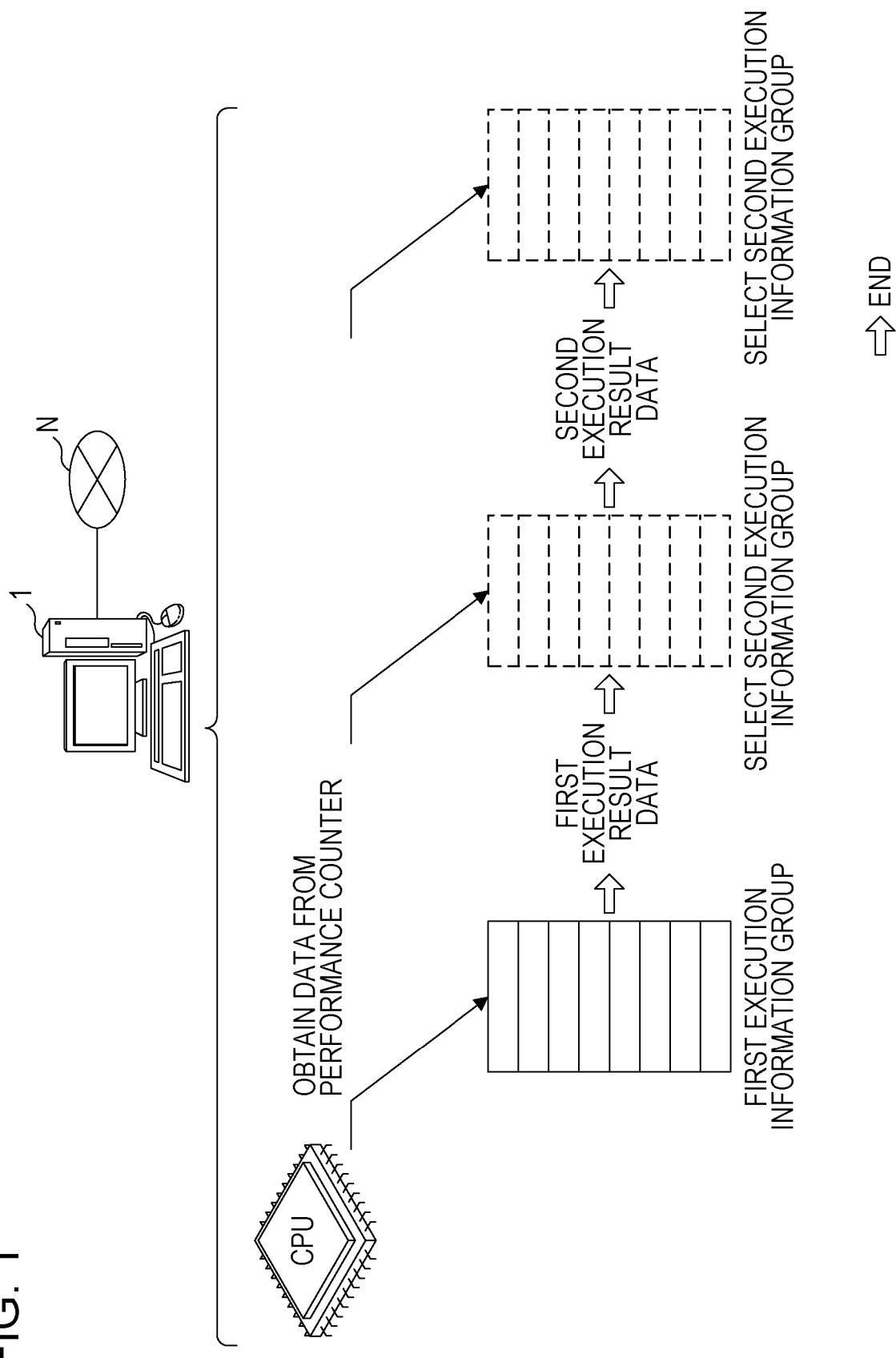
FIG. 1 is an explanatory diagram illustrating an outline of calculation processing.

Embodiments are described below with reference to the drawings. FIG. 1 is an explanatory view illustrating an outline of calculation processing. An information processing apparatus 1 is, for example, a super computer, a server computer, a personal computer, or the like. In the embodiment, description is given with the information processing apparatus 1 referred to as computer 1. Multiple computers 1 are coupled to one another via a network N such as the Internet, a local area network (LAN), or a public network.

The computer 1 obtains count data such as a store wait count and a load memory access wait count, from a performance counter of a central processing unit (CPU), where the performance counter stores various pieces of count data as the performance data for the CPU. A profiler of the computer 1 performs, based on the obtained count data, calculation according to a first execution information group that is a first group of calculation instructions, such as calculation of store wait time and calculation of memory access wait time to obtain a first execution result on each calculation instruction, such as a store wait time. The computer 1 selects, based on the first execution result, a second execution information group that is a second group of calculation instructions, such as a calculation of L2 cache miss count which is performed in the second calculation processing.

The computer 1 calculates a second execution result on each calculation instruction in the selected second execution information group, based on the count data obtained from the performance counter. The computer 1 terminates the subsequent calculation processing or selects the second execution information group to perform the third calculation processing in a similar way, based on the second execution result. Details are described below.

Figure 2:
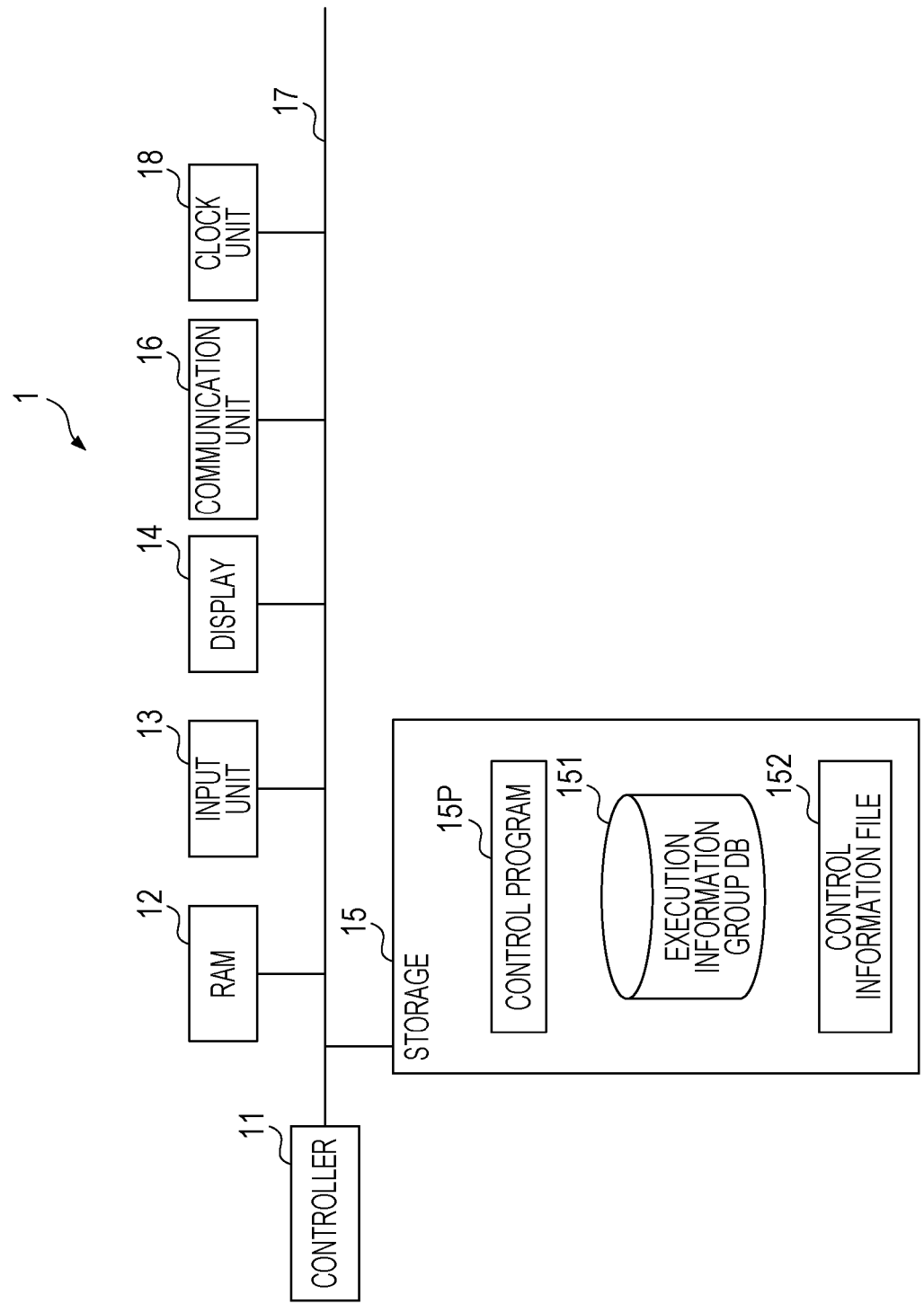
FIG. 2 is a block diagram illustrating a hardware group of a computer.

FIG. 2 is a block diagram illustrating a hardware group of the computer 1. The computer 1 includes a controller 11 such as a central processing unit (CPU) including a performance counter, a random access memory (RAM) 12, an input unit 13, a display 14, a storage 15, a clock unit 18, a communication unit 16, and the like. The controller 11 is coupled to the other hardware units via a bus 17. The controller 11 controls the other hardware units according to a control program 15P stored in the storage 15. Note that the controller 11 may be a multi-core processor provided with multiple processor cores. The RAM 12 is, for example, a static RAM (SRAM), a dynamic RAM (DRAM), a flash memory, or the like. The RAM 12 also functions as a storage and temporarily stores various types of data generated when the controller 11 executes various programs.

The input unit 13 is an input device, such as a mouse, a keyboard, a touch panel, and a button, and outputs received operation information to the controller 11. The display 14 is a liquid crystal display, an organic electroluminescence (EL) display, or the like, and displays various types of information according to instructions of the controller 11. The communication unit 16 is a communication module and exchanges information with not-illustrated other computers. The clock unit 18 outputs date-and-time information to the controller 11. The storage 15 is a large-capacity memory or a hard disk drive and stores the control program 15P, an execution information group database (hereafter, also referred to as DB) 151, a control information file 152, and the like.

FIG. 3 is an explanatory view illustrating a record layout of the execution information group DB 151. The execution information group DB 151 includes type fields and execution information group fields. Each type field stores a type which serves as a unique identifier for identifying an execution information group that is a group of calculation instructions. Each type is given a numerical value such as 1, 2, 3, . . . , 101, . . . 999 or "not specified". Each piece of execution information is a calculation instruction executed on the count data outputted from the performance counter of the CPU and is for example, the calculation of memory access wait time, the calculation of store wait time, the calculation of L2 access wait time, and the like. For example, the controller 11 obtains a store wait count from the performance counter and calculates the store wait time by dividing the obtained store wait count by the clock frequency of the CPU. Note that the clock frequency of the CPU is assumed to be stored in advance as a unique value in the storage 15.

A group of multiple pieces of execution information (a group of calculation instructions) that include the calculation of the memory access wait time, the calculation of store wait time, and the like, is stored in association with the type "not specified". A group of multiple pieces of execution information (a group of calculation instructions) is also stored in association with each of type 1 to type 101 as the second execution information group. Pieces of execution information such as calculation of branch wait time and calculation of fetch wait time are stored in association with type 1. Calculation of L1D cache busy count, calculation of L1D cache miss count, calculation of L1I cache miss count, and the like are stored in association with type 2 as pieces of execution information relating to an L1 cache. Calculation of L2 cache busy count, calculation of L2 cache miss count, and the like are stored in association with type 3 as pieces of execution information relating to an L2 cache.

Pieces of execution information such as calculation of floating point calculation wait time are stored in association with type 101. No execution information group is associated with type 999. As described later, when type 999 is assigned, the controller 11 terminates the processing without obtaining data from the performance counter.

FIG. 4 is an explanatory view illustrating a record layout of the control information file 152. The control information file 152 includes calculation count fields, type fields, data fields, execution result data fields, and the like. Each calculation count field stores the number of times the calculation based on one execution information group is performed by the controller 11. Each type field stores the type that is assigned by the controller 11 in the processing to be described later. Note that, in the first calculation, the type is set at "not specified". Note that, in the following description, "not specified" is sometimes referred to as "type 0".

Each data field stores count data that is obtained from the performance counter by the controller 11 depending on the execution information group associated with the type. Each execution result data field stores results that are calculated by the profiler based on the count data obtained from the performance counter and the corresponding execution information group in the execution information group DB 151. Note that the data and execution result data may be stored in the RAM 12 or the like instead of the control information file.

Figure 5:
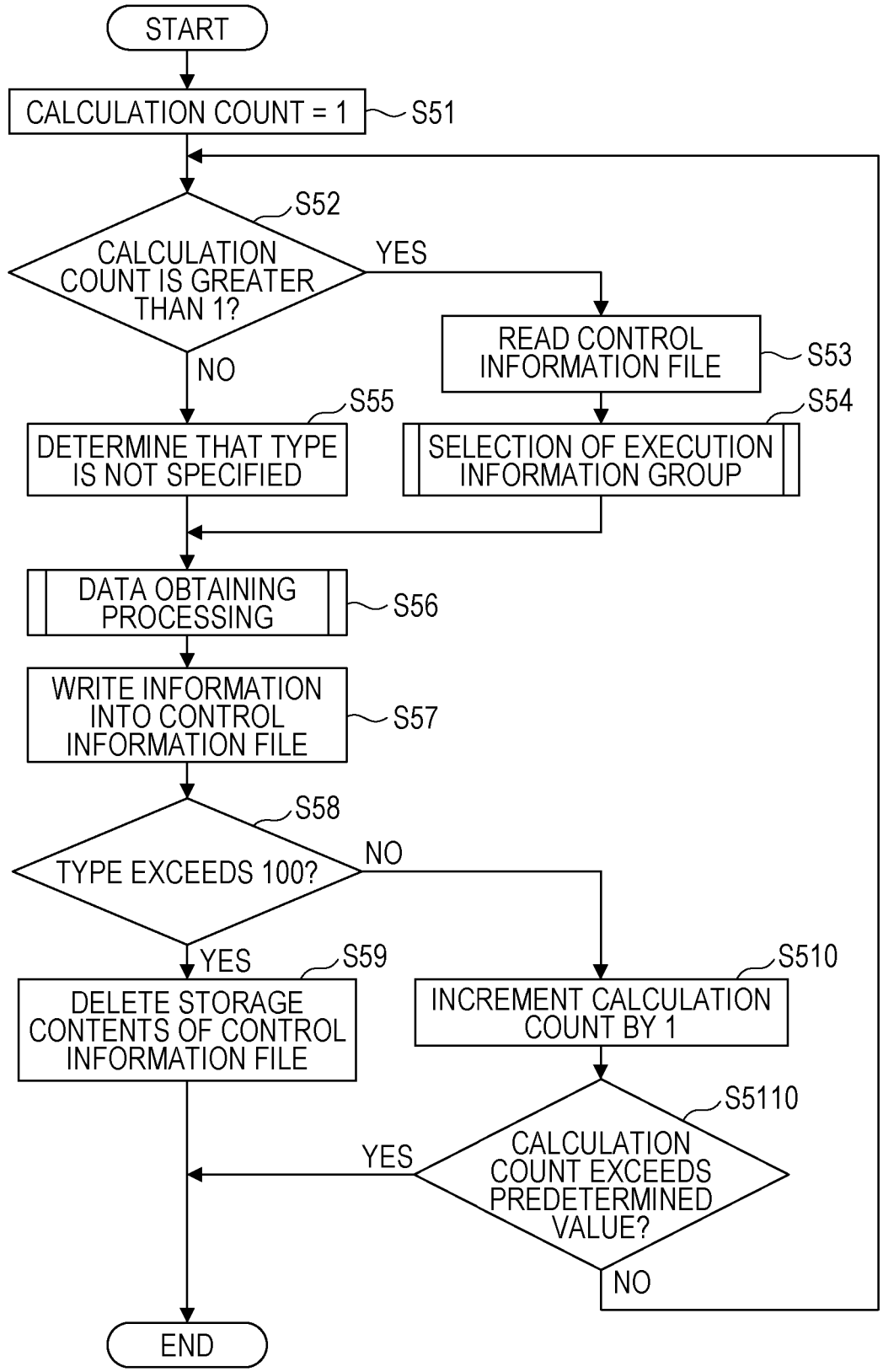
FIG. 5 is a flowchart illustrating steps of the calculation processing.

Various types of software processing performed in the aforementioned hardware group are described by using a flowchart. FIG. 5 is a flowchart illustrating steps of calculation processing. The controller 11 sets 1 to a calculation count (step S51). The controller 11 determines whether the calculation count is greater than 1 (step S52). When the controller 11 determines that the calculation count is not greater than 1 (NO in step S52), the controller 11 causes the processing to proceed to step S55. Since this calculation processing is the first calculation processing, the controller 11 determines that the type is not specified (type 0) (step S55). The controller 11 proceeds to a sub-routine in which data obtaining processing is performed (step S56).

Figure 6:
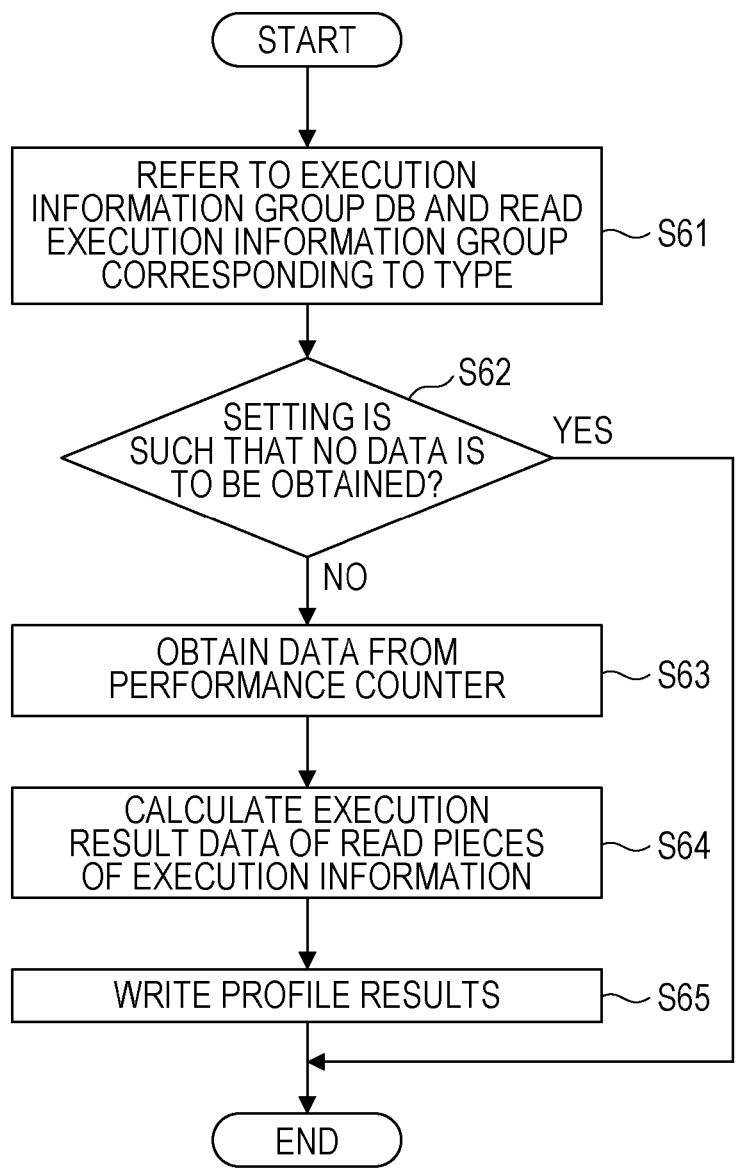
FIG. 6 is a flowchart illustrating steps of data obtaining processing.

FIG. 6 is a flowchart illustrating steps of the data obtaining processing. The controller 11 refers to the execution information group DB 151 and reads the execution information group associated with the type (step S61). Since the type is not specified in the aforementioned example, the controller 11 reads out a group of calculation instructions that indicate calculating the memory access wait time, calculating the store wait time, calculating the L2 access wait time, calculating the L1 access wait time, calculating the calculation wait time, and the like, from the execution information group DB 151 as the execution information group.

The controller 11 determines whether setting is such that no data is to be obtained (step S62). Specifically, the controller 11 refers to the type and the execution information group DB 151 illustrated in FIG. 3 and determines whether the setting is such that no data is to be obtained. When the controller 11 determines that the setting is such that no data is to be obtained (YES in step S62), the controller 11 terminates the sub-routine. For example, in type 999, the setting is such that "no data is to be obtained" and the controller 11 thus terminates the sub-routine. Meanwhile, when the setting is such that data is to be obtained (NO in step S62), the controller 11 causes the processing to proceed to step S63. In types other than type 999, since the setting is such that data is to be obtained depending on the execution information group, the controller 11 proceeds to step S63.

The controller 11 obtains count data to be used, from the performance counter, depending on the execution information group read in step S61 (step S63). For example, when the calculation count is 1, the controller 11 obtains seven pieces of count data of the load memory access wait count, load L2 access wait count, integer load access wait count, integer load memory access wait count, integer load L2 access wait count, integer load memory cache busy wait count, and store wait count. Data obtaining in the case where the calculation count is 2 or more is described later.

The controller 11 calculates an execution result on each piece of the read execution information (each calculation instruction) based on the obtained count data (step S64). The controller 11 performs the calculation of the memory access wait time, the calculation of the store wait time, the calculation of the L2 access wait time, the calculation of the L1 access wait time, the calculation of the calculation wait time, calculation of cycle count, and the like, based on the count data obtained in step S63, the frequency of the CPU, and the like. For example, the controller 11 calculates the store wait time by dividing the store wait count which is the obtained count data by the clock frequency of the CPU. The controller 11 writes profile results (the calculated results) in the RAM 12 (step S65). The controller 11 terminates the sub-routine.

Description of the main routine is given again by returning to step S57 in FIG. 5. The controller 11 writes various pieces of information into the control information file 152 (step S57). For example, the controller 11 writes the calculation count and the type corresponding to the calculation count into the control information file 152. Moreover, the controller 11 writes the count data obtained in step S63 and the execution result calculated in step S64 into the control information file 152.

The controller 11 determines whether a value of the type exceeds a predetermined set value (for example, 100) (step S58). When the controller 11 determines that the type exceeds 100 (YES in step S58), the controller 11 causes the processing to proceed to step S59. The controller 11 deletes storage contents of the control information file 152 (step S59). In the example of FIG. 3, when the type is 101 and when the type is 999, the controller 11 determines that further obtaining of data is unnecessary and terminates the processing.

When the controller 11 determines that the type does not exceed 100 (NO in step S58), the controller 11 causes the processing to proceed to step S510. The controller 11 increments the calculation count by 1 (step S510). The controller 11 determines whether the calculation count after the increment exceeds a predetermined value stored in the storage 15 (step S5110). For example, when the number of all pieces of execution result data to be calculated is 88 and the number of pieces of execution result data obtained per calculation is 8, the predetermined value is set at 11. This predetermined value is an example and the predetermined value may be determined depending on the total number of pieces of execution result data to be calculated and the number of pieces of execution result data obtained per calculation.

When the controller 11 determines that the calculation count exceeds the predetermined value (YES in step S5110), the series of processes is terminated because there are no more pieces of execution result data to be calculated. When the controller 11 determines that the calculation count does not exceed the predetermined value (NO in step S5110), the controller 11 causes the processing to return to step S52. When the controller 11 determines that the calculation count is greater than 1 (YES in step S52), the controller 11 causes the processing to proceed to step S53. For example, when the calculation count is 2 or more, that is, in calculation other than the first calculation, the processing proceeds from steps S53 to S54, and then to step S56.

The controller 11 reads the control information file 152 (step S53). The controller 11 then causes the processing to proceed to a sub-routine in which processing of selecting the execution information group is performed (step S54).

Figure 7:
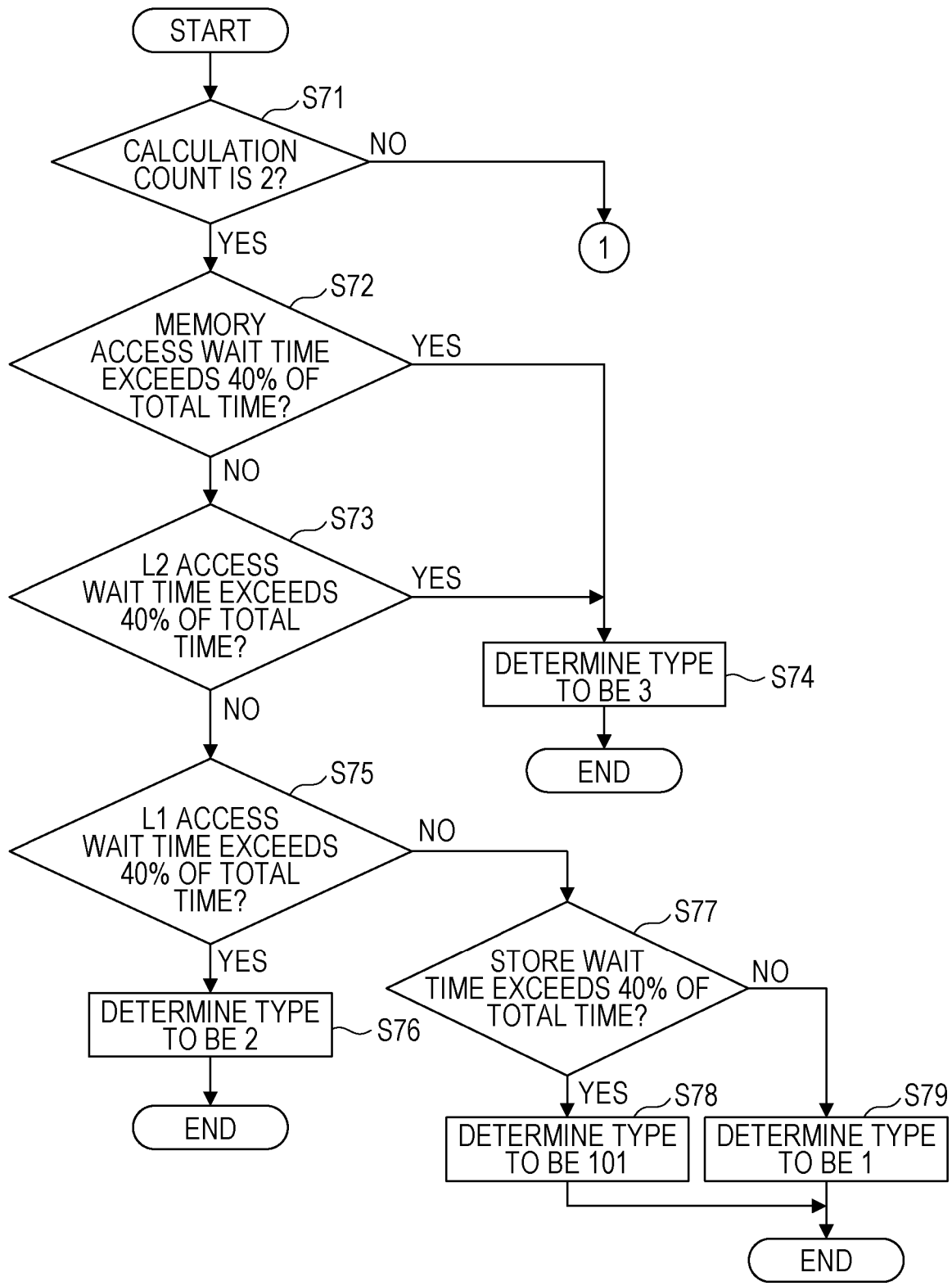
FIG. 7 is a flowchart illustrating steps of selection processing.
Figure 8:
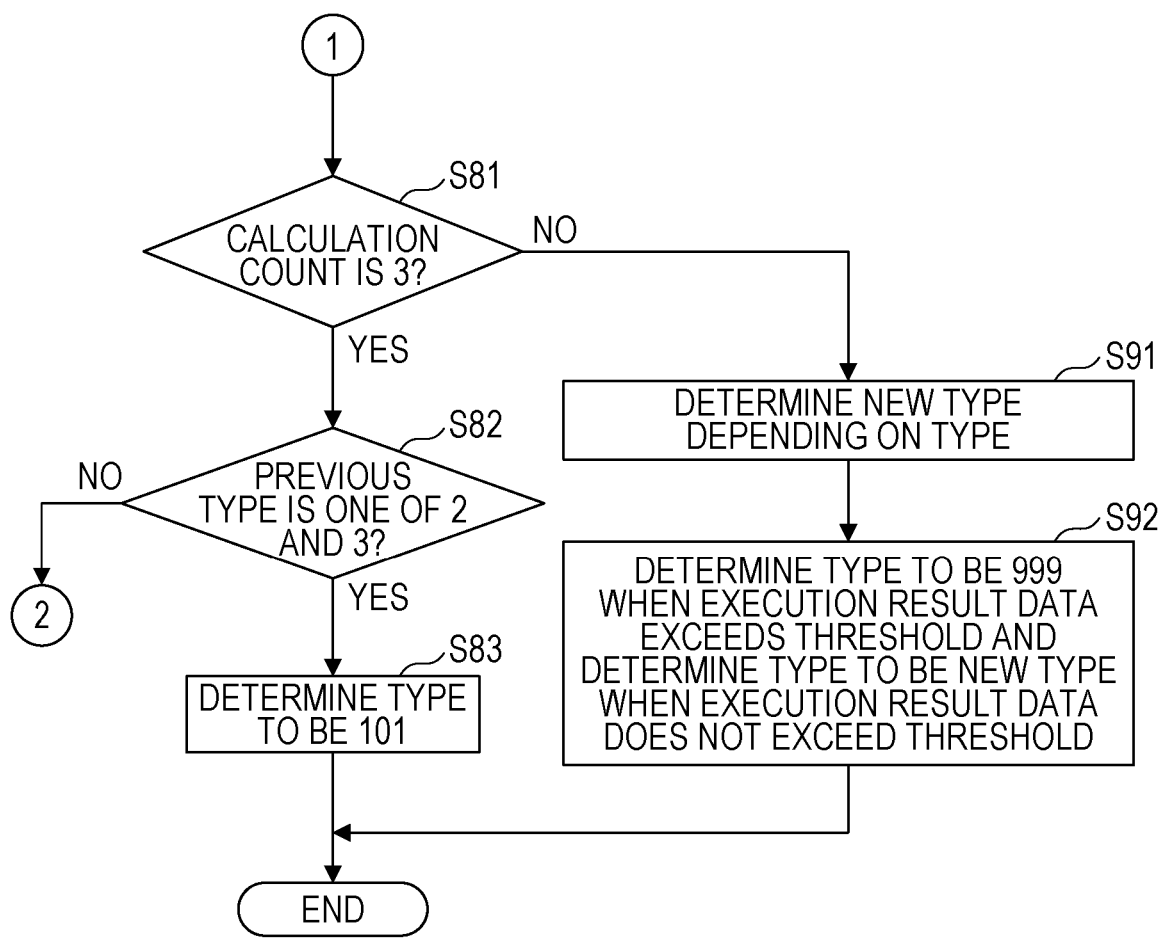
FIG. 8 is a flowchart illustrating steps of the selection processing.
Figure 9:
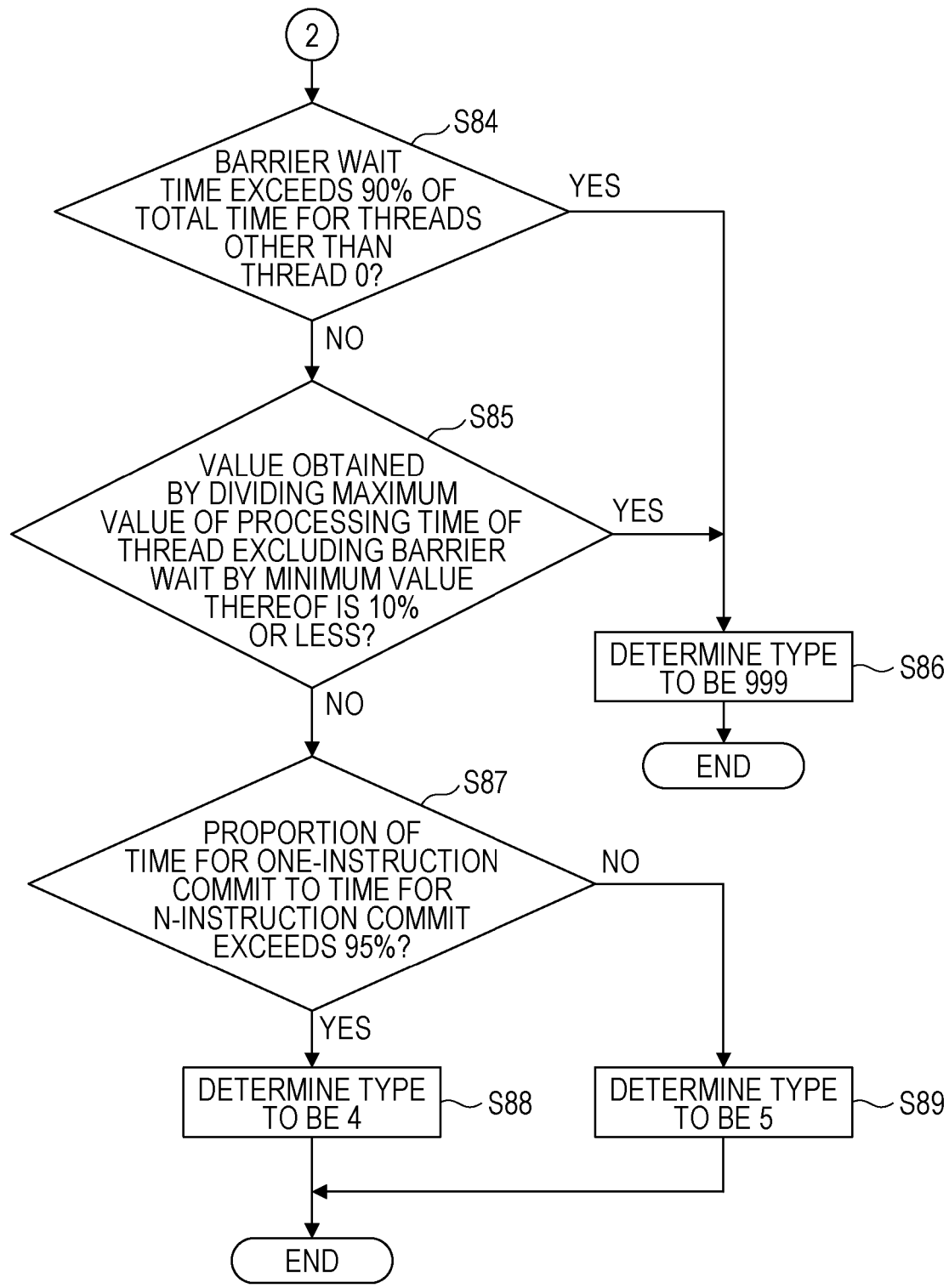
FIG. 9 is a flowchart illustrating steps of the selection processing.

FIGS. 7 to 9 are flowcharts illustrating steps of the selection processing. The controller 11 determines whether the calculation count is 2 (step S71). When the controller 11 determines that the calculation count is 2 (YES in step S71), the controller 11 causes the processing to proceed to step S72. The controller 11 determines whether the memory access wait time exceeds 40% of the total time (step S72). For example, the controller 11 determines whether the memory access wait time stored in the control information file 152 as the execution result exceeds 40% of the total time which is a value obtained by dividing the cycle count data obtained from the performance counter by the clock frequency of the CPU. Note that 40% is an example and the value is not limited to this. The user may set a predetermined threshold as desired by using the input unit 13.

When the controller 11 determines that the memory access wait time does not exceed 40% of the total time (NO in step S72), the controller 11 causes the processing to proceed to step S73. The controller 11 determines whether the L2 access wait time exceeds 40% of the total time (step S73). When the controller 11 determines that the memory access wait time exceeds 40% of the total time (YES in step S72) or the L2 access wait time exceeds 40% of the total time (YES in step S73), the controller 11 causes the processing to proceed to step S74. The controller 11 determines the type to be 3 (step S74). Note that either of the processing of step S72 and the processing of step S73 may be performed first.

When the type is 3, the controller 11 refers to the execution information group DB 151 and selects the second execution information group including the execution information (a calculation instruction) relating to the L2 cache as the data obtaining processing in step S56. For example, the controller 11 performs processing such as the processing of calculating the L2 cache busy count and the processing of calculating the L2 cache miss count. After the processing of step S74, the controller 11 returns the processing to the main routine. When the controller 11 determines that the L2 access time does not exceed 40% of the total time (NO in step S73), the controller 11 causes the processing to proceed to step S75.

The controller 11 determines whether the L1 access wait time exceeds 40% of the total time (step S75). When the controller 11 determines the L1 access wait time exceeds 40% of the total time (YES in step S75), the controller 11 causes the processing to proceed to step S76. The controller 11 determines the type to be 2 (step S76). When the type is 2, the controller 11 refers to the execution information group DB 151 and selects the second execution information group including the execution information (a calculation instruction) relating to the L1 cache as the data obtaining processing of step S56. For example, the controller 11 performs processing such as the calculation of the L1D cache busy count, the calculation of the L1D cache miss count, and the calculation of L1I cache miss count. Then, the controller 11 returns the processing to the main routine.

When the controller 11 determines that the L1 access wait time does not exceed 40% of the total time (NO is step S75), the controller 11 causes the processing to proceed to step S77. The controller 11 determines whether the store wait time exceeds 40% of the total time (step S77). For example, the controller 11 determines whether the store wait time stored in the control information file 152 as the execution result exceeds 40% of the total time. When the controller 11 determines that the store wait time exceeds 40% of the total time (YES in step S77), the controller 11 causes the processing proceed to step S78.

The controller 11 determines the type to be 101 (step S78). When the controller 11 determines that the store wait time does not exceed 40% of the total time (NO in step S77), the controller 11 causes the processing to proceed to step S79. The controller 11 determines the type to be 1 (step S79). After steps S78 and S79, the controller 11 causes the processing to return to the main routine.

When the type is 101, the controller 11 obtains the floating point calculation wait count, the cache busy wait count, and software prefetch (SWPF) busy wait count as the count data obtained from the performance counter. Note that the number of instructions in 1 floating-point operations per second (FLOPS), the number of instructions in 2 FLOPS, the number of instructions in 4 FLOPS, or the number of instructions in 8 FLOPS may be further obtained. The controller 11 divides the floating point calculation wait count by the clock frequency of the CPU to calculate the floating point calculation wait time as the execution result.

When the type is 1, the controller 11 obtains branch instruction wait count, barrier synchronization wait count, the number of cycles in which the number of completed instructions is zero, zero-instruction commit count, one-instruction commit count, two-instruction commit count, three-instruction commit count, and the cycle count as the count data obtained from the performance counter. The controller 11 calculates the branch wait time, the fetch wait time, the barrier wait time, one-instruction commit wait time, and two-and-three-instruction commit wait time, based on the obtained count data.

When the controller 11 determines that the calculation count is not 2 (NO in step S71), the controller 11 causes the processing to proceed to step S81. The controller 11 determines whether the calculation count is 3 (step S81). When the controller 11 determines that the calculation count is 3 (YES in step S81), the controller 11 causes the processing to proceed to step S82. The controller 11 refers to the control information file 152 and determines whether the previous type is one of 2 and 3 (step S82). When the controller 11 determines that the previous type is one of 2 and 3 (YES in S82), the controller 11 proceeds to step S83. The controller 11 determines the type to be 101 (step S83).

When the controller 11 determines that the previous type is neither 2 nor 3 (NO in step S82), the controller 11 causes the processing to proceed to step S84. The controller 11 determines whether the barrier wait time exceeds 90% of the total time for threads other than thread 0 (step S84). For example, the controller 11 obtains the barrier wait time relative to the total time for threads other than thread 0 by dividing the barrier synchronization wait count by the cycle count. Note that one thread is assigned to each of CPUs. Accordingly, data of the thread is obtained for each of independent CPUs. In this case, "for threads other than thread 0" represents performing calculation processing for threads other than a thread with thread number 0 and calculation processing for other items is performed for all threads including the thread with the thread number 0.

When the controller 11 determines that the barrier wait time does not exceed 90% of the total time for threads other than thread 0 (NO in step S84), the controller 11 causes the processing to proceed to step S85. The controller 11 determines whether a value obtained by dividing the maximum value of processing time of the thread excluding the barrier wait by the minimum value thereof is 10% or less (step S85). The controller 11 obtains the processing time of each of the threads excluding the barrier wait by performing the following steps. The controller 11 calculates, for each of the threads, the total time, the barrier wait time, and the processing time excluding the barrier wait time. The total time is obtained by dividing the cycle count by the clock frequency of the CPU. The barrier wait time is obtained by dividing the barrier synchronization wait count by the clock frequency of the CPU. The processing time of each thread excluding the barrier wait time is obtained by subtracting the barrier wait time from the total time.

Next, the controller 11 extracts the maximum value and the minimum value of the processing time of the thread excluding the barrier wait time. The controller 11 determines whether a value obtained by dividing the maximum value of the processing time of the thread excluding the barrier wait time by the minimum value of the processing time of the thread excluding the barrier wait time is 1.1 or less. When the barrier wait time exceeds 90% of the total time for threads except for thread 0 (YES in step S84), the controller 11 causes the processing to proceed to step S86. When the controller 11 determines that the value obtained by dividing the maximum value of the processing time of the thread excluding the barrier wait time by the minimum value thereof is 10% or less (YES in step S85), that is, the value obtained by the dividing exceeds 10% which is a threshold, the controller 11 causes the processing to proceed to step S86.

The controller 11 determines the type to be 999 (step S86). The controller 11 causes the processing to return to the main routine. As described above, when the type is 999, the series of processes is terminated without the data obtaining processing being performed. When the controller 11 determines that the value obtained by dividing the maximum value of the processing time of the thread excluding the barrier wait time by the minimum value thereof is not 10% or less (NO in step S85), the controller 11 causes the processing to proceed to step S87. Note that either of the processing of step S84 and the processing of step S85 may be performed first.

The controller 11 determines whether the proportion of time for one-instruction commit to time for N-instruction commit exceeds 95% (step S87). Note that the values illustrated in steps S84, S85, and S87 are examples and the values are not limited to the illustrated ones. The controller 11 calculates the proportion of time for one-instruction commit to time for N-instruction commit by performing the following processing.

The zero-instruction commit wait time is calculated by dividing zero-instruction commit wait count by the clock frequency of the CPU. The one-instruction commit wait time is obtained by dividing one-instruction commit wait count by the clock frequency of the CPU. The two-and-three-instruction commit wait time is obtained by dividing a sum of two-instruction commit wait count and three-instruction commit count by the clock frequency of the CPU. The four-instruction commit wait time is obtained by subtracting a sum of the zero-instruction commit wait time, the one-instruction commit wait time, and the two-and-three-instruction commit wait time from the total time.

The proportion of time for one-instruction commit to time for N-instruction commit may be obtained by dividing the one-instruction commit wait time by a sum of the one-instruction commit wait time, the two-and-three-instruction commit wait time, and the four-instruction commit wait time. This value is equal to a value obtained by dividing the one-instruction commit wait time by the total value of a first sum and a second sum described below. The first sum is a sum of the one-instruction commit wait time and the two-and-three instruction commit wait time. The second sum is equal to a value obtained by subtracting a sum of the zero-instruction commit wait time, the one-instruction commit wait time, and the two-and-three instruction commit wait time from the total time. Accordingly, the proportion of time for one-instruction commit to time for N-instruction commit is ultimately obtained by dividing the one-instruction commit wait time by a value obtained by subtracting the zero-instruction commit wait time from the total time.

When the controller 11 determines that the proportion of time for one-instruction commit to time for N-instruction commit exceeds 95% (YES in step S87), the controller 11 causes the processing to proceed to step S88. The controller 11 determines the type to be 4 (step S88). When the controller 11 determines that the proportion of time for one-instruction commit to time for N-instruction commit does not exceed 95% (NO in step S87), the controller 11 causes the processing to proceed to step S89. After the processing of steps S88 and S89, the controller 11 causes the processing to return to the main routine.

When the controller 11 determines that the calculation count is not 3 (NO in step S81), the controller 11 causes the processing to proceed to step S91. When the calculation count is 4 or more, the controller 11 performs the following processing as in the case where the calculation count is 3. The controller 11 determines a new type depending on the previously-determined type (step S91). For example, when the previous type is 4, the controller 11 determines the type to be 8 or the like. When the data in the previous calculation is predetermined data and the execution result exceeds a threshold, the controller 11 determines the type to be 999. When the execution result does not exceed the threshold, the controller 11 determines a new type (step S92).

For example, when the previous type is 5 and the execution result exceeds the threshold, the controller 11 determines the type to be 999. Meanwhile, when the previous type is 5 and the execution result does not exceed the threshold, the controller 11 determines a new type (for example, type 7). After the processing of step S92, the controller 11 causes the processing to return to the main routine. In the main routine in FIG. 5, the controller 11 selects the execution information group in step S54 and then causes the processing to proceed to step S56. This enables efficient obtaining of the execution result data. Moreover, this enables obtaining of the execution result data used for determination depending on the situation.

Moreover, it is possible to select an appropriate second execution information group by determining whether the execution result exceeds the threshold. For example, when the memory access wait time exceeds the threshold, the second execution information group including the execution information (a calculation instruction) relating to the L2 cache is selected and this allows appropriate determination to be performed in the following operation. Moreover, for example, when the access wait time for the L2 cache exceeds the threshold value, the second execution information group including the execution information relating to the L2 cache is selected and this allows appropriate determination to be performed in the following operation. Similarly, when the access wait time for the L1 cache exceeds the threshold, the second execution information group including the execution information relating to the L1 cache is selected and this allows appropriate determination to be performed in the following operation.

When the store wait time exceeds the threshold, the second execution information group including the execution information relating to the floating point calculation wait time is selected and this allows appropriate determination to be performed depending on the situation. When the store wait time does not exceed the threshold, the second execution information group including the execution information relating to the branch instruction wait time is selected and this allows appropriate determination to be performed depending on the situation. Moreover, one second execution information group may be selected from multiple second execution information groups by storing the type in the control information file 152.

Furthermore, when the identification information indicating selection of the execution information group including the execution information relating to the L2 cache is stored, the second execution information group including the execution information relating to the floating point calculation wait time is selected and this allows appropriate execution result data to be obtained. Similarly, when identification information indicating selection of the execution information group including the execution information relating to the L1 cache is stored, the second execution information group including the execution information relating to the floating point calculation wait time is selected and this allows appropriate execution result data to be obtained.

When the second execution result exceeds the threshold, the subsequent pieces of execution result data are not calculated and this allows the processing to be terminated earlier than in the case where all pieces of the execution result data are calculated. Moreover, it is possible to reduce utilization time of the computer 1. Meanwhile, when the second execution result exceeds the threshold, the next second execution information group to be continuously executed is selected and this allows the controller 11 to carry on the processing of calculating the execution result data.

Embodiment 2

Figure 10:
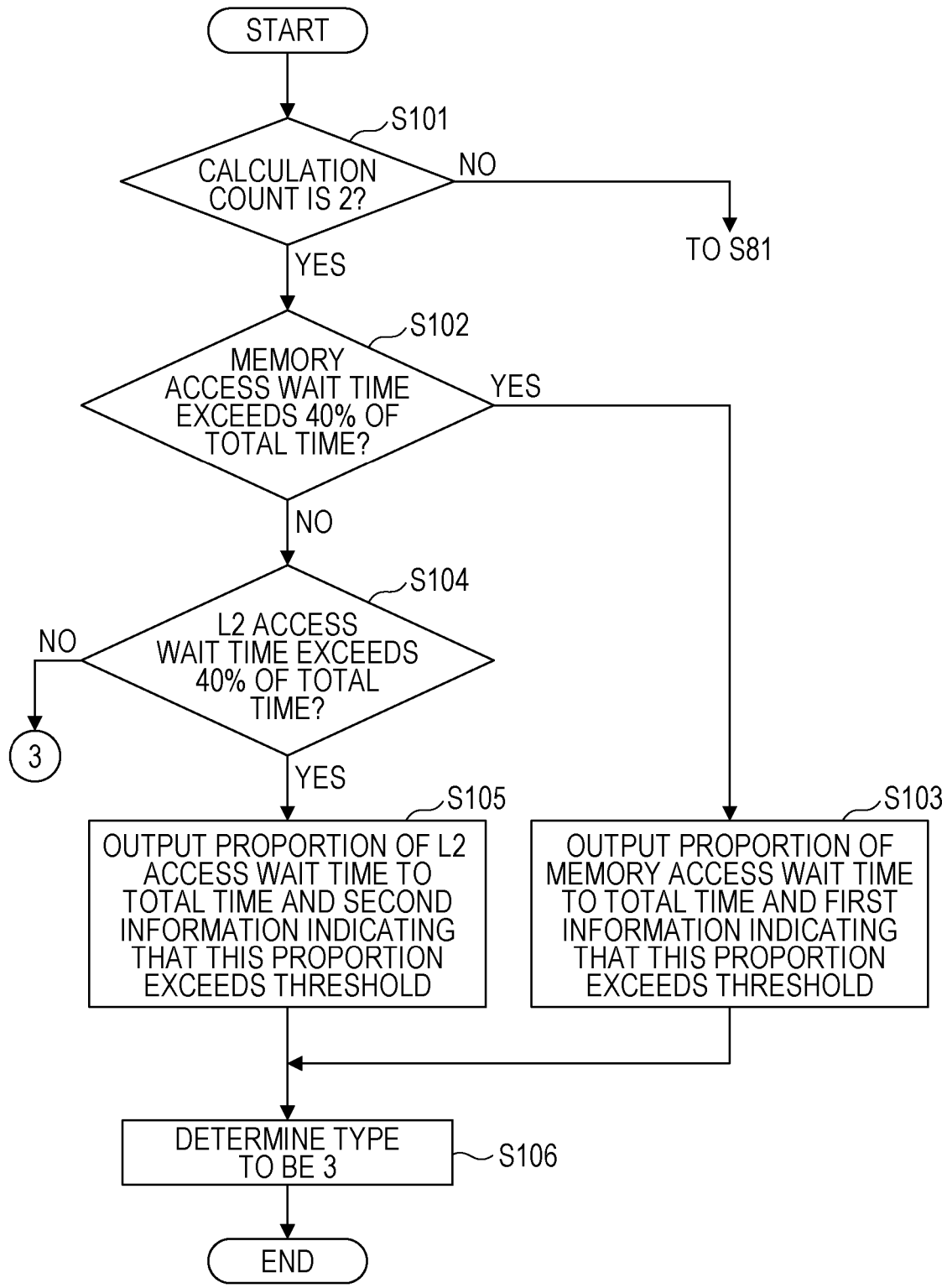
FIG. 10 is a flowchart illustrating steps of output processing.
Figure 11:
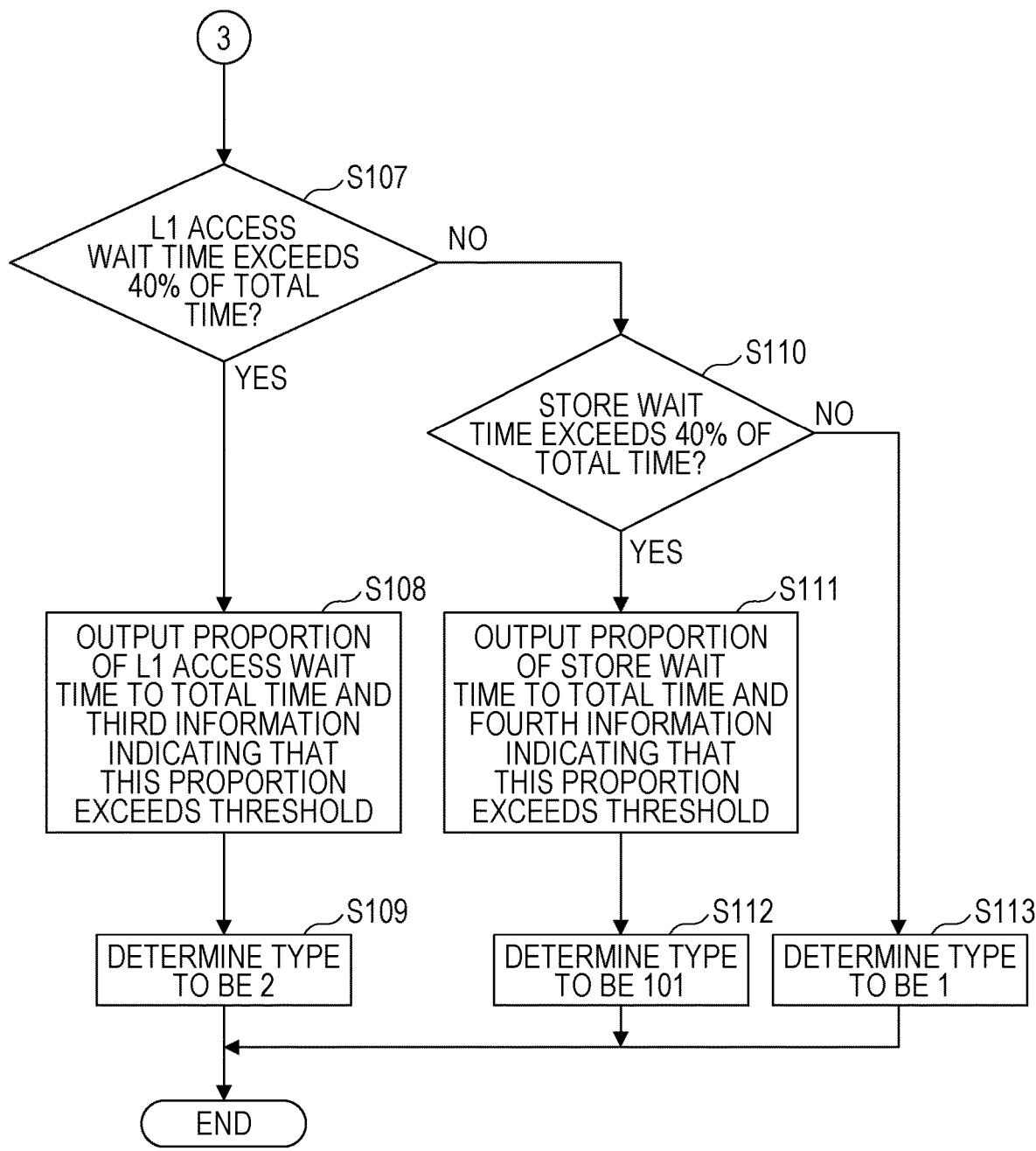
FIG. 11 is a flowchart illustrating steps of the output processing.

Embodiment 2 relates to a mode in which information is outputted when certain data exceeds a threshold. FIGS. 10 and 11 are flowchart illustrating steps of output processing. The controller 11 determines whether the calculation count is 2 (step S101). When the controller 11 determines that the calculation count is 2 (YES in step S101), the controller 11 causes the processing to proceed to step S102. The controller 11 determines whether the memory access wait time exceeds 40% of the total time (step S102).

When the controller 11 determines that the memory access wait time exceeds 40% of the total time (YES in step S102), the controller 11 causes the processing to proceed to step S103. The controller 11 outputs the proportion of the memory access wait time to the total time and first information indicating that this proportion exceeds the threshold (step S103). Note that the output of this information may be performed not only by outputting the information on the display 14 but also by outputting the information to another computer via the communication unit 16. Note that, although description is given of the example in which the controller 11 outputs the proportion of the memory access wait time to the total time as the data relating to the first execution result, the embodiment is not limited to this. The controller 11 may output other memory access wait time or the like.

When the controller 11 determines that the memory access wait time does not exceed 40% of the total time (NO in step S102), the controller 11 causes the processing to proceed to step S104. The controller 11 determines whether the L2 access wait time exceeds 40% of the total time (step S104). When the controller 11 determines that the L2 access wait time exceeds 40% of the total time (YES in step S104), the controller 11 causes the processing to proceed to step S105.

The controller 11 outputs the proportion of the L2 access wait time to the total time and second information indicating that this proportion exceeds the threshold (step S105). After steps S103 and S105, the controller 11 proceeds to step S106. The controller 11 determines the type to be 3 (step S106). When the controller 11 determines that the L2 access wait time does not exceed 40% of the total time (NO in step S104), the controller 11 causes the processing to proceed to step S107.

The controller 11 determines whether the L1 access wait time exceeds 40% of the total time (step S107). When the controller 11 determines that the L1 access wait time exceeds 40% of the total time (YES in step S107), the controller 11 causes the processing to proceed to step S108. The controller 11 outputs the proportion of the L1 access wait time to the total time and third information indicating that this proportion exceeds the threshold (step S108). Then, the controller 11 determines the type to be 2 (step S109).

When the controller 11 determines that the L1 access wait time does not exceed 40% of the total time (NO in step S107), the controller 11 causes the processing to proceed to step S110. The controller 11 determines whether the store wait time exceeds 40% of the total time (step S110). When the controller 11 determines that the store wait time exceeds 40% of the total time (YES in step S110), the controller 11 causes the processing to proceed to step S111. The controller 11 outputs the proportion of the store wait time to the total time and fourth information indicating that this proportion exceeds the threshold (step S111).

The controller 11 then causes the processing to proceed to step S112. The controller 11 determines the type to be 101 (step S112). When the controller 11 determines that the store wait time does not exceed 40% of the total time (NO in step S110), the controller 11 causes the processing to proceed to step S113. The controller 11 determines the type to be 1 (step S113). After steps S112 and S113, the controller 11 causes the processing to return to the main routine.

When the controller 11 determines that the calculation count is not 2 (NO in step S101), the controller 11 causes the processing to proceed to step S81. Note that, since the processing from step S81 and beyond is the same as that in Embodiment 1, the description thereof is omitted. In this embodiment, it is thus possible to easily grasp the cause of the bottleneck occurring. Moreover, it is possible to grasp the degree of delay occurring.

Embodiment 2 is as described above and, since other portions are the same as those in Embodiment 1, the corresponding portions are denoted by the same reference numerals and detailed description thereof is omitted.

Embodiment 3

Figure 12:
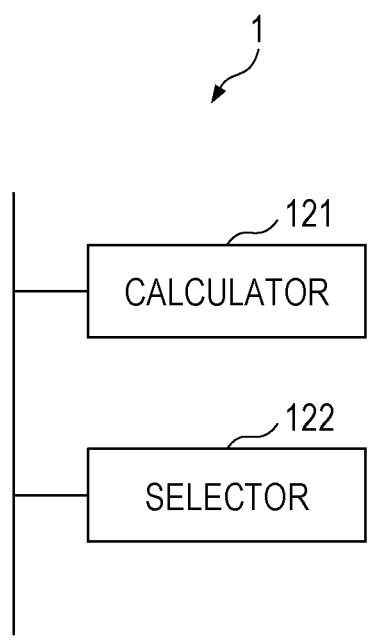
FIG. 12 is a functional block diagram of a computer in the aforementioned embodiments.

FIG. 12 is a functional block diagram of the computer 1 in the aforementioned embodiments. The computer 1 operates as described below by causing the controller 11 to execute the control program 15P. A calculator 121 calculates the first execution result on each of the pieces of execution information in the first execution information group, based on the count data obtained from the performance counter. A selector 122 selects the second execution information group to be executed next, based on the calculated first execution result.

Figure 13:
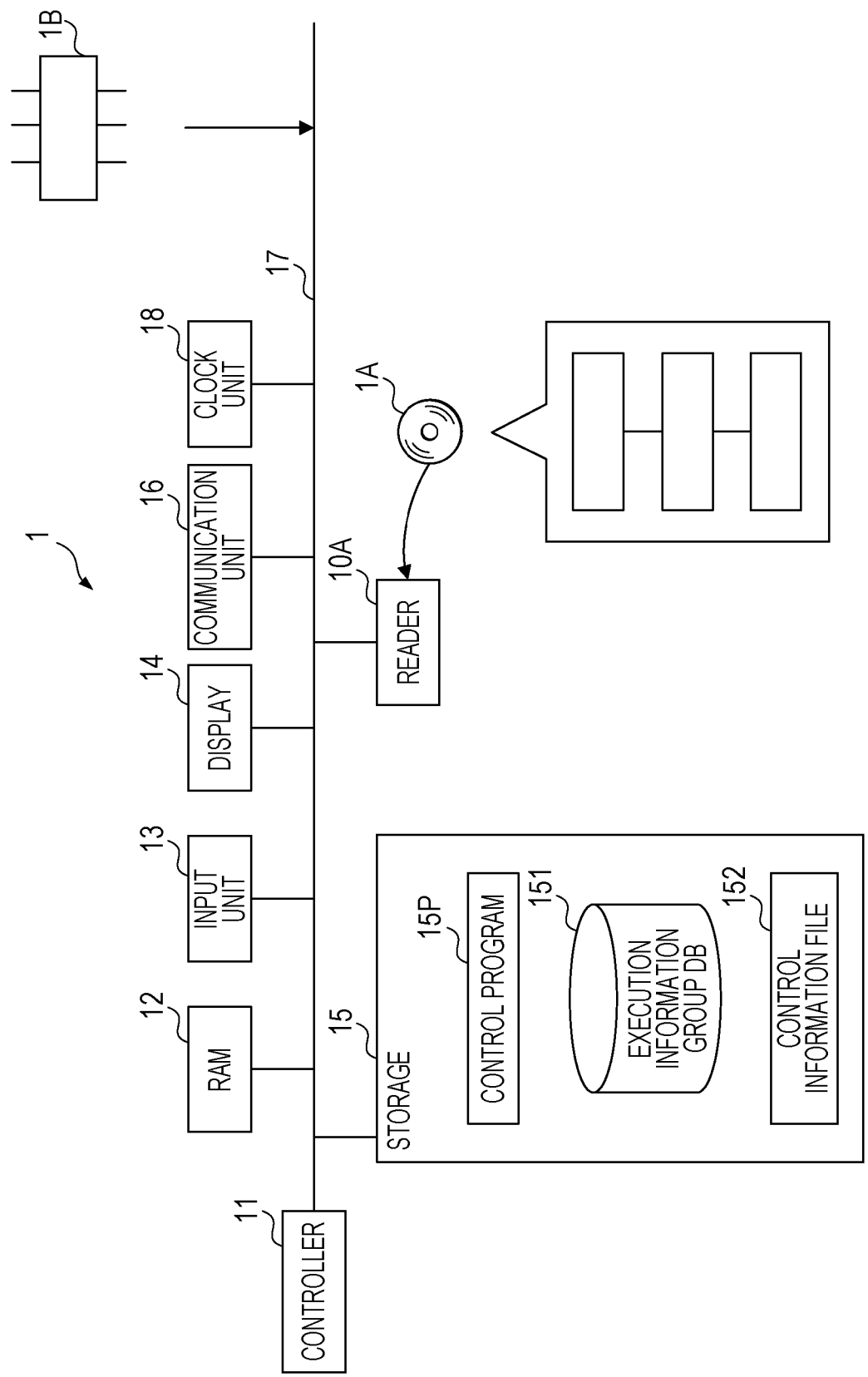
FIG. 13 is a block diagram illustrating a hardware group of a computer according to Embodiment 3.

FIG. 13 is a block diagram illustrating a hardware group of the computer 1 according to Embodiment 3. A program for operating the computer 1 may be stored in the storage 15 by causing a reader 10A such as a disc drive or a memory card slot to read a portable recording medium 1A such as a CD-ROM, a DVD disc, a memory card, or a USB memory. Moreover, a semiconductor memory 1B such as a flash memory storing the program may be incorporated in the computer 1. Furthermore, the program may be downloaded from another server computer (not illustrated) coupled to the computer 1 via the communication network N such as the Internet. The contents of program are described below.

The computer 1 illustrated FIG. 13 reads the program which execute the various type of software processing described above, from the portable recording medium 1A or the semiconductor memory 1B or download it from the other server computer (not illustrated) via the communication network N. The program is thereby installed as the control program 15P and loaded on the RAM 12 to be executed. The computer thereby functions as the computer 1 described above.

The embodiment 3 is as described above and, since other portions are the same as those in Embodiments 1 and 2, the corresponding portions are denoted by the same reference numerals and detailed description thereof is omitted. Note that the aforementioned embodiments may be combined as appropriate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the computer including a performance counter that stores plural types of performance data for the computer, the process comprising:
   providing plural groups of calculation instructions;
   calculating a first execution result by executing, based on a first type of performance data obtained from the performance counter, each calculation instruction included in a first group of calculation instructions corresponding to the first type of performance data;
   selecting a second group of calculation instructions to be executed next, from among the plural groups of calculation instructions, based on the calculated first execution result; and
   calculating a second execution result by executing, based on a second type of performance data obtained from the performance counter, each calculation instruction included in the second group of calculation instructions corresponding to the second type of performance data.

2. The non-transitory, computer-readable recording medium of claim 1, the process further comprising:
   determining whether the first execution result exceeds a threshold; and
   selecting the second group of calculation instructions, depending on a result of the determining.

3. The non-transitory, computer-readable recording medium of claim 1, wherein
   the first execution result includes a memory access wait time; and
   the process includes selecting the second group of calculation instructions that include a calculation instruction relating to a L2 cache when the memory access wait time obtained from the first execution result exceeds a threshold.

4. The non-transitory, computer-readable recording medium of claim 1, wherein
the first execution result includes an access wait time for a L2 cache; and
the process includes selecting the second group of calculation instructions that include a calculation instruction relating to the L2 cache when the access wait time for the L2 cache obtained from the first execution result exceeds a threshold.

5. The non-transitory, computer-readable recording medium of claim 1, wherein
the first execution result includes an access wait time for a L1 cache; and
the process includes selecting the second group of calculation instructions that include a calculation instruction relating to the L1 cache when the access wait time for the L1 cache obtained from the first execution result exceeds a threshold.

6. The non-transitory, computer-readable recording medium of claim 1, wherein
the first execution result includes a store wait time; and
the process includes selecting the second group of calculation instructions that include a calculation instruction relating to a floating point calculation wait time when the store wait time obtained from the first execution result exceeds a threshold.

7. The non-transitory, computer-readable recording medium of claim 1, wherein
the first execution result includes a store wait time; and
the process includes selecting the second group of calculation instructions that include a calculation instruction relating to a branch instruction wait time when the store wait time obtained from the first execution result does not exceed a threshold.

8. The non-transitory, computer-readable recording medium of claim 1, the process further comprising storing identification information for identifying the selected second group of calculation instructions.

9. The non-transitory, computer-readable recording medium of claim 8, the process further comprising:
determining whether first identification information identifying the second group of calculation instructions that include a calculation instruction relating to a L2 cache is stored; and
upon determining that the first identification information is stored, selecting, as the second group of calculation instructions, a group of calculation instructions that include a calculation instruction relating to a floating point calculation wait time.

10. The non-transitory, computer-readable recording medium of claim 8, the process further comprising:
determining whether first identification information identifying the second group of calculation instructions that include a calculation instruction relating to a L1 cache is stored; and
upon determining that the first identification information is stored, selecting, as the second group of calculation instructions, a group of calculation instructions that include a calculation instruction relating to a floating point calculation wait time.

11. The non-transitory, computer-readable recording medium of claim 1, the process further comprising determining whether the second execution result exceeds a threshold; and
when the second execution result does not exceed a threshold, selecting the second group of calculation instructions to be executed next.

12. The non-transitory, computer-readable recording medium of claim 11, wherein the process includes, when the second execution result exceeds the threshold, not selecting the second group of calculation instructions to be executed next.

13. The non-transitory, computer-readable recording medium of claim 1, wherein
the first execution result includes a memory access wait time; and
the process includes, when the memory access wait time obtained from the first execution result exceeds a threshold, outputting data relating to the first execution result and information indicating that the memory access wait time exceeds the threshold.

14. An apparatus comprising:
a memory configured to store plural groups of calculation instructions;
a processor coupled to the memory and configured to include a performance counter that stores plural types of performance data for the processor, the processor is configured to:
calculate a first execution result by executing, based on a first type of performance data obtained from the performance counter, each calculation instruction included in a first group of calculation instructions corresponding to the first type of performance data;
select a second group of calculation instructions to be executed next, from among the plural groups of calculation instructions, based on the calculated first execution result; and
calculate a second execution result by executing, based on a second type of performance data obtained from the performance counter, each calculation instruction included in the second group of calculation instructions corresponding to the second type of performance data.

15. A method performed by an apparatus including a performance counter that stores plural types of performance data for a processor included in the apparatus, the method comprising:
providing plural groups of calculation instructions;
calculating a first execution result by executing, based on a first type of performance data obtained from the performance counter, each calculation instruction included in a first group of calculation instructions corresponding to the first type of performance data;
selecting a second group of calculation instructions to be executed next, from among the plural groups of calculation instructions, based on the calculated first execution result; and
calculating a second execution result by executing, based on a second type of performance data obtained from the performance counter, each calculation instruction included in the second group of calculation instructions corresponding to the second type of performance data.

* * * * *